United States Patent [19]

Blankenberger et al.

[11] Patent Number: 5,355,941
[45] Date of Patent: Oct. 18, 1994

[54] SEALING APPARATUS FOR A HEAT EXCHANGER MANIFOLD

[75] Inventors: Gary J. Blankenberger, Westland; Richard G. Gibbons, Jr., Fraser, both of Mich.

[73] Assignee: Ford Motor Company, Dearborn, Mich.

[21] Appl. No.: 123,127

[22] Filed: Sep. 17, 1993

[51] Int. Cl.⁵ .............................. F28F 9/02
[52] U.S. Cl. .................... 165/67; 165/153; 180/68.4
[58] Field of Search ............ 165/67, 69, 153, 173; 180/68.4

[56] References Cited

U.S. PATENT DOCUMENTS

| | | | |
|---|---|---|---|
| 4,367,793 | 1/1983 | MacIntosh | 180/68.4 X |
| 4,569,390 | 2/1986 | Knowlton et al. | |
| 4,579,184 | 4/1986 | Hiramoto | 165/67 X |
| 4,960,169 | 10/1990 | Granetzke | |
| 5,052,480 | 10/1991 | Nakajima et al. | 165/153 |
| 5,076,354 | 12/1991 | Nishishita | |

FOREIGN PATENT DOCUMENTS 58-164996  9/1983  Japan .
2090652   7/1982  United Kingdom .

*Primary Examiner*—John C. Fox
*Attorney, Agent, or Firm*—Raymond L. Coppiellie; Roger L. May

[57] ABSTRACT

A heat exchanger for an automotive vehicle comprising a manifold assembly, a plurality of tubular elements, a plurality of fin elements is described. The heat exchanger further includes a sealing apparatus for sealing the manifold assemblies and for providing a mounting attachment for securing the heat exchanger in the vehicle.

12 Claims, 2 Drawing Sheets

SEALING APPARATUS FOR A HEAT EXCHANGER MANIFOLD

BACKGROUND OF THE INVENTION

1. Field of the Invention

The present invention relates generally to heat exchangers. More particularly, the present invention relates to an apparatus which seals the ends of the manifolds of a heat exchanger and provides for attachment of the heat exchanger to an automotive vehicle.

2. Disclosure Information

Fin and tube type heat exchangers are commonly used in vehicle, industrial and residential environments for heating and cooling purposes. Typically, these heat exchangers utilize a plurality of tubes to form a condenser or the like by having fluid pass through a plurality of tubes. A plurality of fin elements are interleaved with the tubes and provide excellent heat transfer characteristics as is well known in the art. The number of tubes utilized depends upon the thermal capacity requirements of the fin and tube heat exchanger. A manifold assembly interconnects these tubes so that fluid can flow through the tubes.

In multi-flow or parallel flow-type condensers, a pair of manifolds are used at opposite ends of the tubes and the fluid flows from one manifold to the other through the tubes in a predefined pathway. As is shown in U.S. Pat. Nos. 5,076,354 and 4,569,390, these manifolds are typically circular or D-shaped in cross-section. To prevent the fluid from escaping from the manifolds, end caps are brazed to the opposite ends of the manifolds. The end caps disclosed in the above patents simply provide for sealing the ends of the manifolds and serve no other purpose. British Patent 2,090,652 discloses a heat exchanger having a side support extending the entire length of the heat exchanger and which includes an end cap not formed integrally therewith. The patent further discloses that a mounting attachment may be secured to the side support for attaching the heat exchanger to a vehicle. This type of sealing mechanism wherein the end cap is formed integrally with the side support can be difficult to fabricate and tends to leak because of the thermal cycling of the heat exchanger during operation. Therefore, it would be advantageous to provide an end cap separate and apart from the side support of the heat exchanger which provides for sealing of the manifolds and attachment of the heat exchanger to the vehicle.

SUMMARY OF THE INVENTION

The present invention overcomes the disadvantages of the prior art by providing a heat exchanger for an automotive vehicle comprising a generally elongated, tubular manifold assembly having a pair of terminating ends, a plurality of tubular elements being fluidly connected to the manifold assembly and defining air paths between adjacent pairs of tubular elements, a plurality of fin elements provided in the air paths, and a pair of side support members disposed adjacent the manifold assembly on opposite sides of the plurality of tubular elements. The heat exchanger further includes plug means for sealing at least one of the terminating ends of the manifold assembly and for providing a mounting attachment for securing the heat exchanger in the vehicle. Preferably, the plug means is fabricated as a one-piece unit and is configured to engage the inner diameter of the manifold assembly along its axis of elongation. The plug means includes a plug portion and an attachment portion, the plug portion including a tab projecting therefrom for engaging a notch in the manifold assembly for preventing rotation of the plug relative to the manifold during the manufacturing process.

It is an advantage of the present invention to provide a combination sealing plug and attachment member for a heat exchanger which is easy to fabricate and which prevents rotation of the plug during the assembly process.

These and other objects, features and advantages of the present invention will become apparent from the drawings, detailed description and claims which follow.

DETAILED DESCRIPTION OF THE PREFERRED EMBODIMENTS

Figure 1:
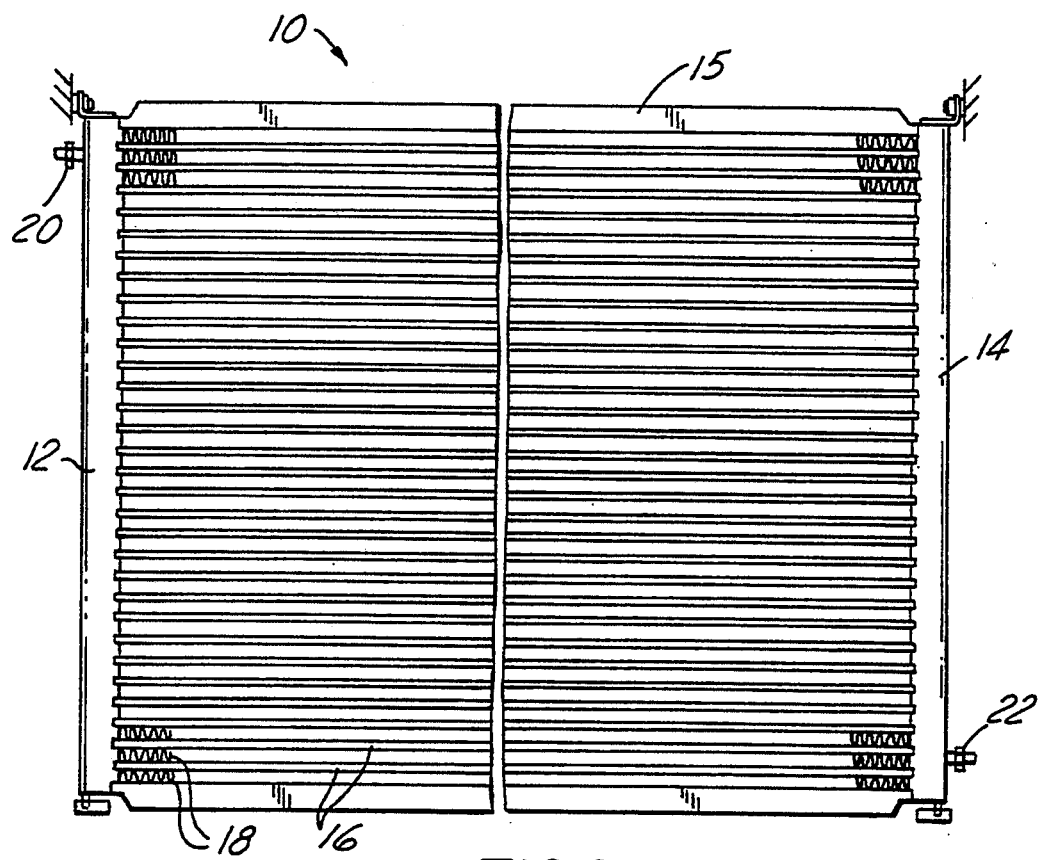
FIG. 1 is a perspective view of a heat exchanger structured in accord with the principles of the present invention.

Referring now to the drawings, FIG. 1 shows a parallel flow, or multi-flow heat exchanger 10 for use in an automotive vehicle. Such heat exchanger could be a condenser for liquefying gaseous coolant in an air conditioning system of the vehicle after the system has compressed the coolant in a known manner. It should be apparent to those skilled in the art that the principles of the present invention could be applied to other types of heat exchangers as well. The condenser 10 includes a pair of generally elongate manifold assemblies 12, 14, each having a longitudinal axis and disposed in spaced, substantial parallel relationship at opposite ends of the condenser. A pair of side supports 15 are disposed adjacent and orthogonal to the manifold assemblies 12 and 14 and complete the outer frame of the core of the heat exchanger 10. A plurality of substantially parallel tubular elements 16 are disposed in spaced relationship and define flow paths for the coolant between the manifold assemblies 12, 14. Interposed between each of the tubular elements 16 are a plurality of fin members 18 provided in a conventional manner. A fluid inlet port 20 and fluid outlet port 22 are attached at opposite sides of the manifolds 12, 14, respectively, in a known manner. In operation, the compressed coolant enters the inlet 20 and is forced through the substantially parallel tubular elements 16 along a plurality of flow paths defined by baffles within the manifolds. At the outlet 22, the compressed coolant has condensed into its liquid state and flows to the next stage in the air conditioning system.

Figure 2:
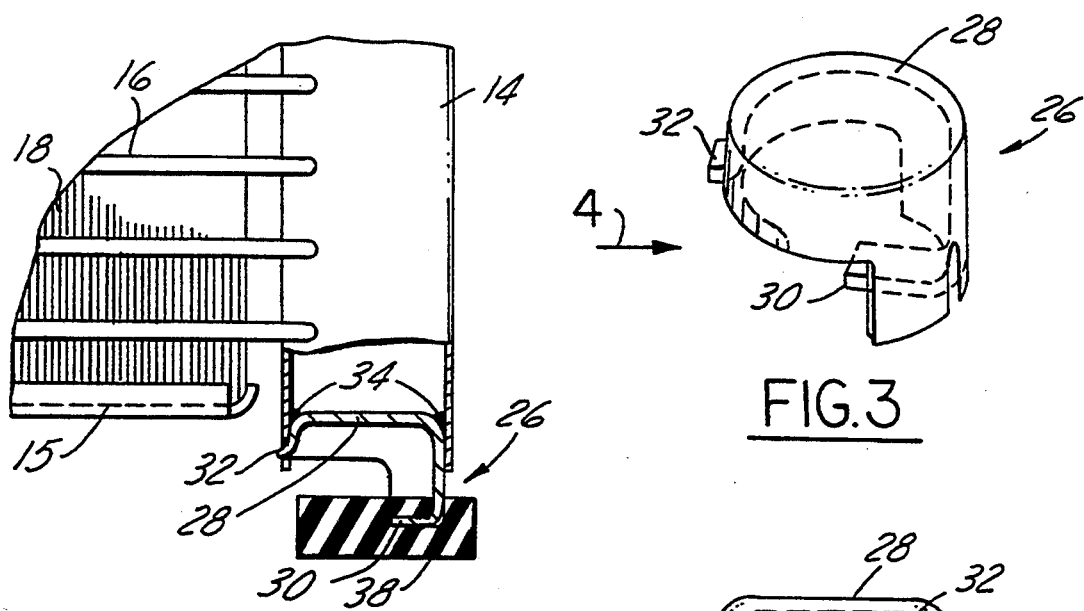
FIG. 2 is an enlarged view of a portion of FIG. 1.
Figure 3:
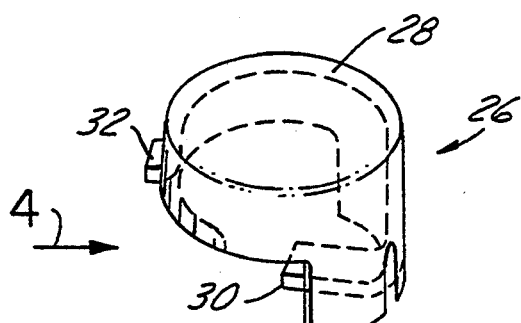
FIG. 3 is a perspective view of an apparatus of the present invention.

As can be seen in further detail in FIG. 2, each of the terminating ends of the manifold assemblies are sealed with a sealing apparatus 26 according to the present invention. The sealing apparatus 26 provides a leak-free seal to the end of the manifold assemblies 12, 14, as well as provides a mounting attachment for securing the heat exchanger into the vehicle. As such, the sealing apparatus 26 comprises a plug means for sealing the manifold and providing a mounting attachment for the heat exchanger. The sealing apparatus 26 is fabricated as a one-piece unit through either a stamping or impact extrusion process, and typically is fabricated from an aluminum alloy. As shown in FIGS. 2-3 the sealing apparatus 26 includes a plug portion 28 which engages the inner diameter of the manifold assembly along the longitudinal axis thereof. The apparatus 26 further includes an attachment portion 30 which receives a mounting fastener therethrough for securing the heat exchanger to the vehicle. The heat exchanger can be secured to either a frame part of the vehicle or to another part of the air conditioning system such as the radiator.

The plug portion 28 of seal 26 is generally cylindrical and matingly engages the inner diameter of the manifold assembly 12, herein being circular. It is contemplated that the plug portion 28 would have a configuration which matingly engages the internal configuration of the manifold assembly. The plug portion 28 further includes a tab 32 projecting therefrom. The tab 32 engages a notch (not shown) in the wall of the manifold assembly 12 for ensuring proper location of the plug relative to the manifold as well as for preventing rotation of the plug 26 during the assembly process. If the plug 26 rotates during assembly either due to the thermal cycling of the brazing operation or through jostling during manufacturing, the potential for leakage of the heat exchanger is increased. By providing means for preventing rotation of the plug, the manufacturing efficiency is improved. Also, it is important that the attachment portion 30 of the sealing apparatus 26 be properly aligned with the mounting holes in the vehicle so that the heat exchanger 10 can be secured into its proper location in the vehicle. By providing tab 32 into a notch, the location of the attachment portion 30 relative to its mounting position in the vehicle is ensured. The plug portion 28 of apparatus 26 is brazed to the manifold assembly 12 at 34 to provide a leak-free seal of the manifold assemblies.

Figure 4:
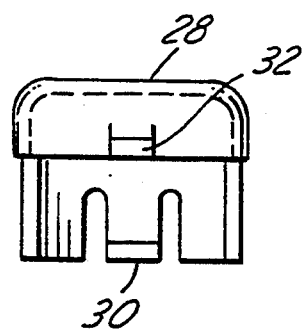
FIG. 4 is a cross-sectional view taken along line 4—4 of FIG. 3.

As shown in FIGS. 2-4, the attachment portion 30 is formed integrally with the plug portion 28 of apparatus 26. In this manner, the sealing apparatus 26 is in effect a combination sealing plug and attachment device for sealing and attaching the heat exchanger in the vehicle. As shown in FIGS. 3 and 4, the attachment portion of apparatus 26 includes a bent-over arm member 30 disposed generally transverse to the elongation axis or longitudinal axis of the manifold assembly. The arm member 30 is configured to receive a mounting block, such as a grommet 38 therein. The grommet may be of any of a known type of mounting block which provides for insulation against noise, vibration and harshness between the heat exchanger and the vehicle. The mounting block may comprise a solid elastomeric block which fits into a corresponding location in the vehicle and may also include an aperture for receiving a threaded fastener therethrough.

Figure 5:
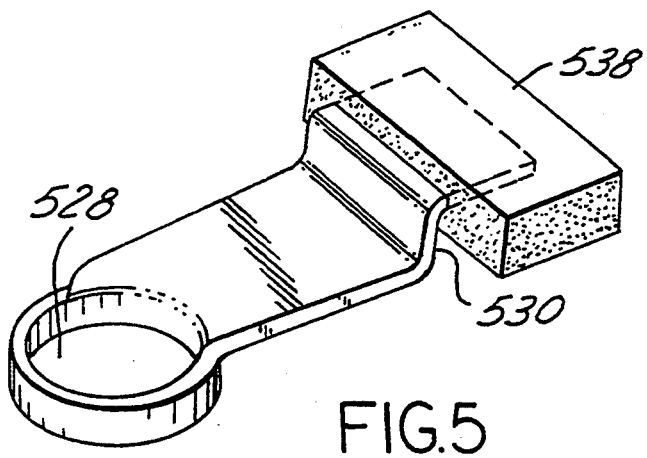
FIG. 5 is a perspective view of an alternative embodiment of a sealing apparatus according to the present invention.
Figure 6:
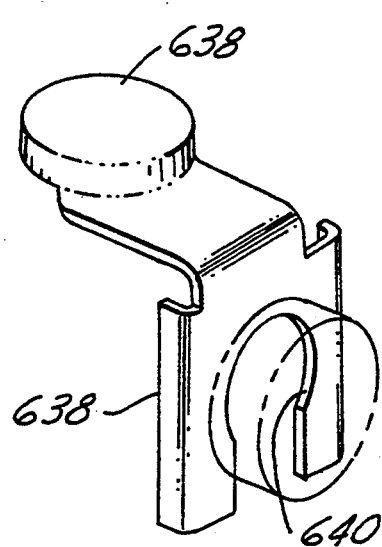
FIG. 6 is a perspective view of an alternative embodiment of a sealing apparatus according to the present invention.
Figure 7:
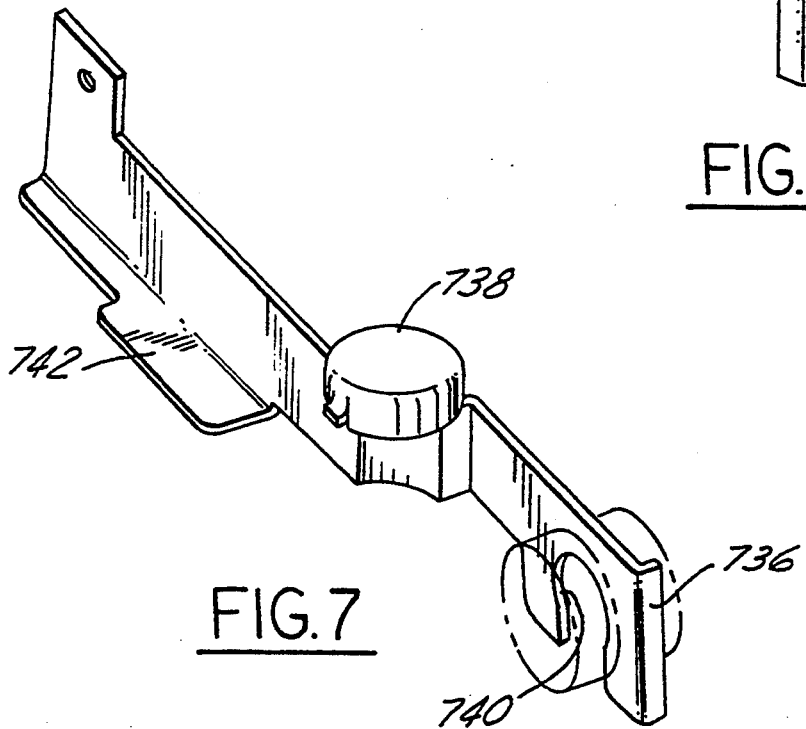
FIG. 7 is a perspective view of an alternative embodiment of a sealing apparatus according to the present invention.

FIGS. 5-7 show alternative embodiments of the sealing apparatus 26 of the present invention. As shown in the drawings, like elements share the same reference numerals with the different features being given the figure number as the left-most number. As shown in FIG. 5, the attachment portion 530, is also disposed generally transverse to the longitudinal axis of the manifold assembly but is not bent over as in the embodiment of FIGS. 3 and 4. The arm member 536 is generally configured as above for receiving a mounting block such as a grommet for receiving a threaded fastener therethrough. Alternatively, the attachment portions of the sealing apparatus 26 may be disposed generally parallel to the longitudinal axis of the manifold assemblies as shown in FIGS. 6 and 7. As shown therein, the arm members 636, 736, respectively, include a generally U-shaped slot 640, 740 for receiving a grommet or other mounting fastener therethrough as described above. The sealing apparatus 26 of FIG. 7 further includes a flange 742 for supporting the heat exchanger tubes adjacent to the manifold assemblies. In this manner, the sealing apparatus of the present invention provides three functions of tube support, sealing and attachment to the vehicle.

Various other modifications and alterations of the present invention will be obvious to those skilled in the art. For example, the heat exchanger of FIG. 1 could utilize a single embodiment of the sealing plug of the present invention or could utilize all four alternative embodiments at respective corners thereof. Also, the sealing plug can be manufactured from a variety of materials in a variety of manufacturing operations. Also, the sealing plug of the present invention can be replaced by a sealing cap which is secured over the external diameter of the manifold assemblies as opposed to matingly engaging the internal diameter as with the plug portion of the present invention. It is the following claims, including all equivalents, which define the scope of my invention.

What is claimed is:

1. A heat exchanger for an automotive vehicle, comprising:
   a generally elongate, tubular manifold assembly having a pair of terminating ends;
   a plurality of tubular elements being fluidly connected to the manifold assembly and defining air paths between adjacent pairs of tubular elements;
   a plurality of fin elements provided in said air paths;
   a pair of support members disposed adjacent said manifold assembly on opposite sides of the plurality of tubular elements; and
   one piece plug means for sealing at least one of said terminating ends of said manifold assembly and for providing a mounting attachment for securing said heat exchanger in said vehicle, said plug means comprising a plug portion configured to engage the inner diameter of said manifold assembly along the axis of elongation thereof and an attachment portion adapted to receive a mounting fastener therethrough for securing said heat exchanger to said vehicle.

2. A heat exchanger according to claim 1, wherein said plug portion includes a tab projecting therefrom, said tab being configured to engage a notch in said manifold assembly for preventing rotation of said plug means relative to said manifold during the manufacturing process.

3. A heat exchanger according to claim 1, wherein said attachment portion is formed integral with said plug portion and extends away from said terminating end of said manifold assembly.

4. A heat exchanger according to claim 3, wherein said attachment portion includes an arm member disposed generally transverse to the elongation axis of said manifold assembly, said arm member including grommet means for receiving a grommet therein for securing said heat exchanger to said vehicle.

5. A heat exchanger according to claim 3, wherein said attachment portion includes an arm member disposed generally parallel to the elongation axis of said manifold assembly, said arm member including grommet means for receiving a grommet therein for securing said heat exchanger to said vehicle.

6. A heat exchanger according to claim 5, wherein said plug means further comprises tube support means for supporting said plurality of tubular elements, said tube support means being disposed parallel with the elongate axis of said tubular elements.

7. A condenser for liquefying gaseous coolant in an air conditioning system of an automobile after the system has compressed the coolant, said condenser comprising:
- a generally elongate, circular manifold assembly having a pair of terminating ends;
- a plurality of tubular elements being connected to the manifold assembly and defining air paths between adjacent pairs of tubular elements;
- a plurality of fin elements provided in said air paths;
- a pair of support members disposed at opposite ends of said condenser for supporting the tubular elements thereby;
- a one-piece plug means for sealing at least one of said terminating ends of said manifold assembly and for providing a mounting attachment for securing said heat exchanger in said vehicle, said plug means comprising a generally circular plug portion configured to engage the inner diameter of said manifold assembly along an elongation axis thereof, and an attachment portion formed integrally with said plug portion and adapted to receive a mounting fastener therethrough for securing said heat exchanger to said vehicle.

8. A heat exchanger according to claim 7, wherein said plug portion includes a tab projecting therefrom, said tab being configured to engage a notch in said manifold assembly for preventing rotation of said plug means relative to said manifold assembly during the manufacturing process.

9. A heat exchanger according to claim 7, wherein said attachment portion includes an arm member disposed generally transverse to the elongation axis of said manifold assembly, said arm member including grommet means for receiving a grommet therein for securing said heat exchanger to said vehicle.

10. A heat exchanger according to claim 7, wherein said attachment portion includes an arm member disposed generally parallel to the elongation axis of said manifold assembly, said arm member including grommet means for receiving a grommet therein for securing said heat exchanger to said vehicle.

11. A heat exchanger according to claim 10, wherein said plug means further comprises tube support means for supporting said plurality of tubular elements, said tube support means being disposed parallel with the elongate axis of said tubular elements.

12. A sealing apparatus for a heat exchanger of an automotive vehicle, said heat exchanger comprising a core having a generally elongate, tubular manifold assembly with a pair of terminating ends, a plurality of tubular elements being fluidly connected to the manifold assembly and defining air paths between adjacent pairs of tubular elements, a plurality of fin elements provided in said air paths, and a pair of support members disposed adjacent said manifold assembly on opposite sides of the plurality of tubular elements, said apparatus comprising:
- a one-piece, stamped plug means for sealing at least one of said terminating ends of said manifold assembly and for provided a mounting attachment for securing said heat exchanger in said vehicle, said plug means comprising a plug portion configured to engage the inner diameter of said manifold assembly along an elongation axis thereof, and an attachment portion adapted to receive a mounting fastener therethrough for securing said heat exchanger to said vehicle.

* * * * *